C. L. NORTON.
SELF FILTERING COMPOSITION.
APPLICATION FILED JULY 6, 1908.
929,002.
Patented July 27, 1909.
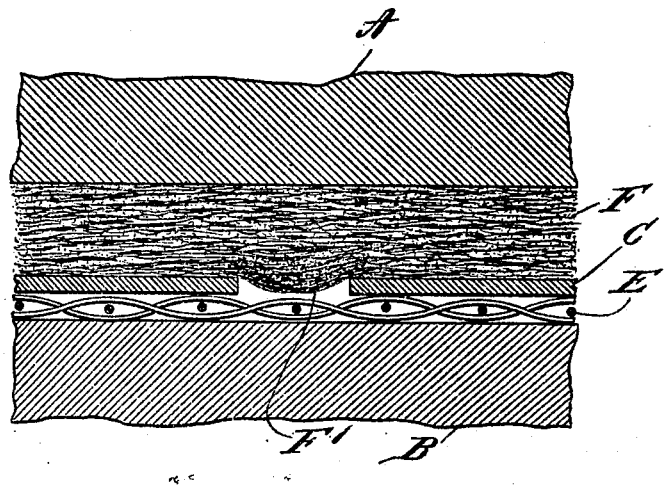

UNITED STATES PATENT OFFICE.

CHARLES LADD NORTON, OF MANCHESTER, MASSACHUSETTS.

SELF-FILTERING COMPOSITION.

No. 929,002. Specification of Letters Patent. Patented July 27, 1909.

Application filed July 6, 1908. Serial No. 442,042.

*To all whom it may concern:*

Be it known that I, CHARLES LADD NORTON, a citizen of the United States, and resident of Manchester, in the county of Essex and State of Massachusetts, have invented new and useful Improvements in Self-Filtering Compositions, of which the following is a specification.

My invention consists of a self-filtering composition and relates to the production of compacted material from which mixtures containing fibrous material and solid or semi-solid cementitious matter and, initially at least, a liquid such as is usually required to insure the proper performance of the functions of the cementitious material.

Particularly, my invention relates to the production of refractory materials from substances of which asbestos is a type, for instance such refractory materials as are described in Letters Patent of the United States No. 847,293, granted to me under date of March 12, 1907.

Moreover, my invention herein described relates to the production of such refractory materials by the compression of the mixed ingredients of which they are composed, and the object of this invention is to facilitate and expedite the manufacture of such substances and to contribute to their industrial production the benefits of certainty of process and uniformity of product.

Where as in the case of the refractory material described in my patent aforesaid, the ingredients which are subjected to pressure (namely, the fibers of the cementitious material and the liquid) are placed in a filter press, the filtration of the surplus liquid from the mixture must be effectuated in such manner that the liquid expressed may not carry with it too much of the cementitious material, which to perform its function properly, must remain in the body of the material together with a sufficient residual quantity of water to effect the setting of the cement. Consequently, if filtering material on a filter bed is relied upon to retain the finely comminuted material, the mesh thereof must be extremely fine, in most cases as fine as bolting cloth, if its functions are to be properly performed.

While the employment of fine textile filtering material is mechanically feasible and effective to produce slabs or sheets of refractory material of the general character above indicated, yet such filtering webs are undesirable and troublesome in a continuous series of operations, principally for the reason that they very soon become impregnated with cementitious material which sets in the mesh and renders the filter thereafter useless and also because such filter webs are fragile and ill suited to sustain heavy pressure; even though carefully supported. It is for this reason, I believe, that the manufacturers of certain refractory materials containing hydraulic cement have resorted to the formation of sheets by flowing a stream composed of fibers (such as asbestos) hydraulic cement, and an abundance of water, upon the web-forming screens of paper machines, and have subsequently superposed sheets thus formed, after the manner of card board manufacture, rather than adopt treatment by combined pressure and filtration, although a filter-pressed body containing the ingredients above named is superior in many respects to the laminated structures heretofore made.

My invention in its broader aspect, is characterized by the formation of a mixture of the essential ingredients, namely:—fibers, solid or semi-solid; cementitious material, and a suitable liquid,—of such character and consistency that, when a mass of such mixture is spread upon a perforated metal screen, the fibers of the mixture will, by interlacing and felting automatically and of themselves, form filtration webs over and across relatively large perforations in a filter sheet, so that these foundation fibers themselves furnish a filter web of fineness sufficient to retain within the body of the material the cementitious material, while allowing surplus liquid to be expressed. In properly compounded mixtures constituted principally of asbestos fibers, (even those very short fibers produced by the grinding of serpentine rock) these foundation fibers of the mixture form an effective retaining filtration web over apertures in a perforated metal sheet 1/16″ in diameter. The physical condition essential to the performance of this function by the fibers in the mass under treatment is that the proportion of liquid in the material shall be less than that which would produce mobility of the fibers in the liquid. If too much liquid is employed so that the fibrous ingredients of the material float about it, as soon as the mixture is placed upon a filter bed provided only with a perforated metal sheet, the fibers themselves and a large portion of the cementitious material escape through the perforations, thus depriving the mixture of part of a very essential ingredient, for the reason that the cementitious material is usually very finely comminuted. Again, if the cementitious material with or without a portion of the fiber escapes through the mesh or perforations in the filter bed, the spaces in the filter bed soon become clogged and, as the cementitious material sets, the functional utility of the filter bed is destroyed, and if it be used in a hydraulic press the filtration sheets and webs become firmly cemented to the head of the press, from which they can be removed only with great difficulty. It is hardly necessary to state that, while the proportion of the liquid in the material should be less than that which will produce mobility of the fibers therein, it should be at least sufficient for the purpose of combination with the cementitious material. This condition, however, is very easily secured without danger of exceeding the proper maximum limit.

In the drawings hereto annexed there is illustrated conventionally in part and on a very much enlarged scale, a portion of a filter press and its bed showing the characteristic behavior of a self filtering composition which embodies my invention.

This invention comprises the self-filtering composition and also the process which the employment of such composition involves. The process which is described herein in order to illustrate fully the value and mode of operation of the self-filtering composition is described in an application for patent filed concurrently herewith serially numbered 442,044 and is reserved for claim therein; in its specific aspect also one of the filtering compositions herein described is also described in another application for patent Serial Number 442,043 filed by me concurrently herewith and is reserved for claim therein.

As stated hereinabove, the compositions, for the production of refractory material of the class to which my invention relates consists of fibrous cementitious material and the liquid required for the functional operation of the cementitious material in and among the fibers. One takes, for instance, a mass of fibers of which asbestos is a type, these may either be asbestos fibers as ordinarily understood or may consist of the fibrous pulp produced by grinding the serpentine rock from which asbestos is mined. With these fibers, preferably in a dry state, there is mixed a suitable quantity of dry hydraulic cement; suitable proportions are ten to twelve parts by weight of hydraulic cement (Portland cement) and twenty parts by weight of asbestos fiber. When these are thoroughly mixed, to the dry mixture there is added a quantity of water sufficient to effect the proper setting of the cement, (allowance being made for the water which is subsequently to be pressed out of the material) but less than that quantity of water which, when thoroughly mixed with the fiber and cement, will render the fibers mobile in the liquid. Assuming that the solid ingredients mixed in the proportions above stated are dry, a proper proportion will be fifty parts of water by weight. When this quantity of water is mixed thoroughly with the solid ingredients, the entire mass is of the consistency of a wet mush of which the solid portion will retain the water temporarily at least without allowing any sensible portion thereof to drain off or settle. This mixture is then placed upon the filter bed of the filter press.

Referring to the drawings; A and B represent the upper and lower press heads or press plates. Upon the lower press plate there is laid a sheet of woven wire E and over this a sheet of perforated metal C. The perforations in this sheet S should be close together and preferably quite small, though they may, without impairing the success of the process, be as large as 1/16" in diameter Smaller perforations, even as small as 1/64" are, however, preferable for the reason that by the use of smaller perforations the lower surface of the finished compressed product is more nearly plane than it is when larger perforations are employed. Practice and experience with the particular mixture of materials used as ingredients of the article of manufacture produced, will determine more exactly the proper diameter and spacing of the apertures in the top of the filter bed. The object to be attained is the formation of webs or nets composed of the fibers which form an ingredient of the material, over and across the perforations in the filter bed sheet, and the preservation of these webs during the compression stage of the process so that, while surplus liquid will pass through the self-formed webs of fiber, the cementitious material will be retained within the body of the article produced.

Referring again to the drawing, F represents the fibers in the mass under pressure, and the dots (not lettered) represent the particles of cementitious material. When the mixture as above described is spread upon the filter bed and subjected to pressure between the plates A and B, simultaneously with the initial flow of liquid through the apertures in the perforated sheet C the foundation fibers mat together and form a web as at F' stretched across the apertures in the sheet C. The web possesses sufficient tensile strength to retain its integrity even though the pressure between the press plates A and B exceed one ton to the square inch. These webs of the foundation fibers retain the cementitious material, while allowing surplus water to escape. When, after the compressed sheet or slab is removed from the press, it is examined closely, the lower surface of it will be found covered with slight protuberances, showing where the retaining webs of the foundation fibers have sagged slightly into the apertures of the top sheet of the filter bed, and it has also been observed in many instances that the cementitious material is more dense immediately behind these little protuberances than elsewhere in the body of the finished article. This apparently demonstrates the tendency of the finely comminuted cementitious material to flow toward and to escape from the body of the mixture under pressure and also demonstrates the effectiveness of the self-formed webs of foundation fiber to prevent the escape of the cementitious material from the body of the mixture.

If the mixture under treatment is of the character described in my patent aforesaid, the following specifications are recommended. The ingredients being asbestiform fiber, finely divided magnesium oxid, and water, one proceeds by first mixing in a dry state from $2\frac{1}{2}$ to 3 parts by weight of the asbestiform fiber, with 1 part by weight of magnesium oxid, the latter being preferably procured by the calcination of finely divided magnesium carbonate as set forth in my said patent. Then 1 part by weight of this mixture of asbestiform fiber and magnesium oxid is mixed with 2 parts by weight of water. These proportions are correct provided the solids are thoroughly dry; if they have laid for any length of time in a moist atmosphere, water absorbed from the air must be taken account of. The correct manipulation and adjustment of the proportion of water mechanically added must be learned by experience and checked by observation. The quality of the wet mush and also the behavior of the mixture in the press will serve as checks upon the operation of water addition. Too little water will cause the compressed sheets or plates to adhere too intimately to the press head and too much water will manifest its excess by the quality of the liquid which flows from the press. The expressed liquid should run from the press nearly clear; if it is milky, then it is certain that too much water is being added to the material in the preparation for the press. A slight milkiness or cloudiness of the water which first emerges from the press will always be observed but it is of no consequence. It is the subsequent flow of which the character serves as a detector of an excess of water in the mixture. Conversely the character of the waste water from the press for the same reason will betray error in mixing the dry solid ingredients; if these involved too scant proportions of fiber, the mobility of the fibers in the liquid added will allow fiber and cement to pour through the filter perforations, and the expressed liquid will flow cloudy throughout the operation.

The mixed mass placed in the press is subjected to a pressure, preferably of one ton or more to the square inch. The foundation fibers, as illustrated in the drawing, form retaining webs over the perforations in the upper sheet of the filter bed and retain the magnesium oxid in the body of the article produced and insure the cementation of substantially the entire quantity of magnesium oxid originally incorporated in the mixture.

What I claim and desire to secure by Letters Patent hereby is as follows:

1. A self-filtering composition consisting of fibers, comminuted cementing material and a liquid appropriate thereto, the proportion of the liquid being less than that productive of mobility of the fibers therein.

2. A self-filtering composition consisting of asbestiform fibers, cementing material and a liquid appropriate thereto, the proportion of the liquid being less than that productive of mobility of the fibers therein.

3. A self-filtering composition consisting of asbestiform fibers, hydraulic cement and water, the proportion of water being less than that productive of mobility of the fibers therein.

4. A self-filtering composition consisting of twenty parts by weight of asbestiform fibers, ten to twelve parts of hydraulic cement and fifty parts of water.

Signed by me at Boston, Massachusetts, this fifteenth day of June 1908.

CHARLES LADD NORTON.

Witnesses:
CHARLES D. WOODBERRY,
JOSEPHINE H. RYAN.